United States Patent Office 2,911,725
Patented Nov. 10, 1959

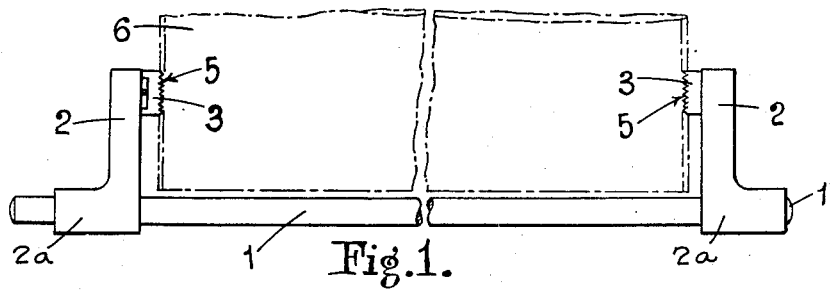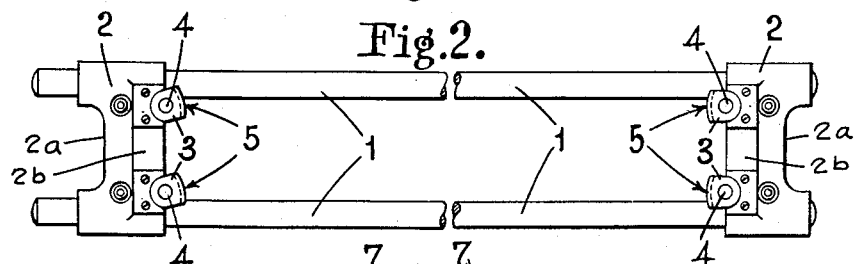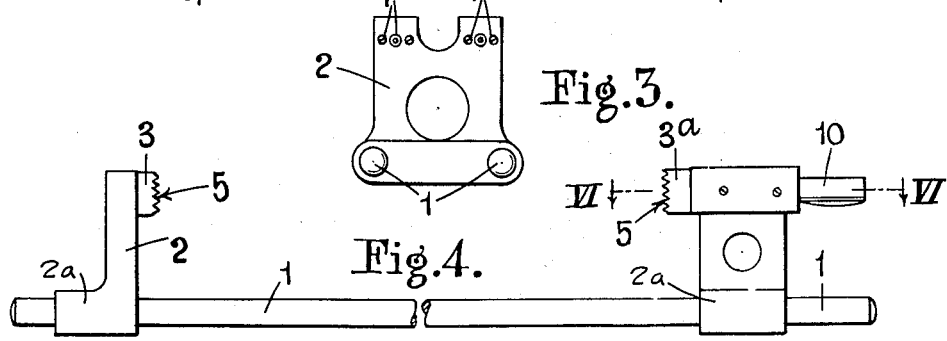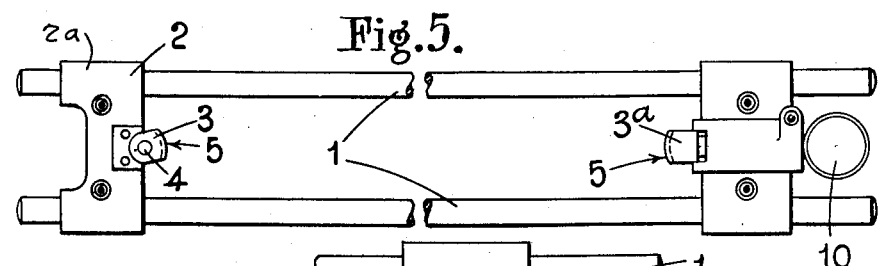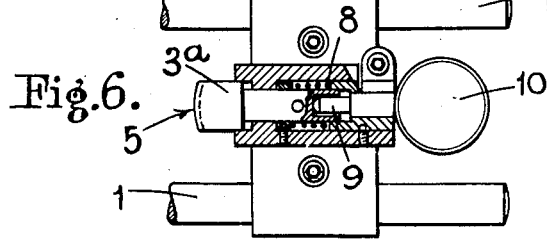

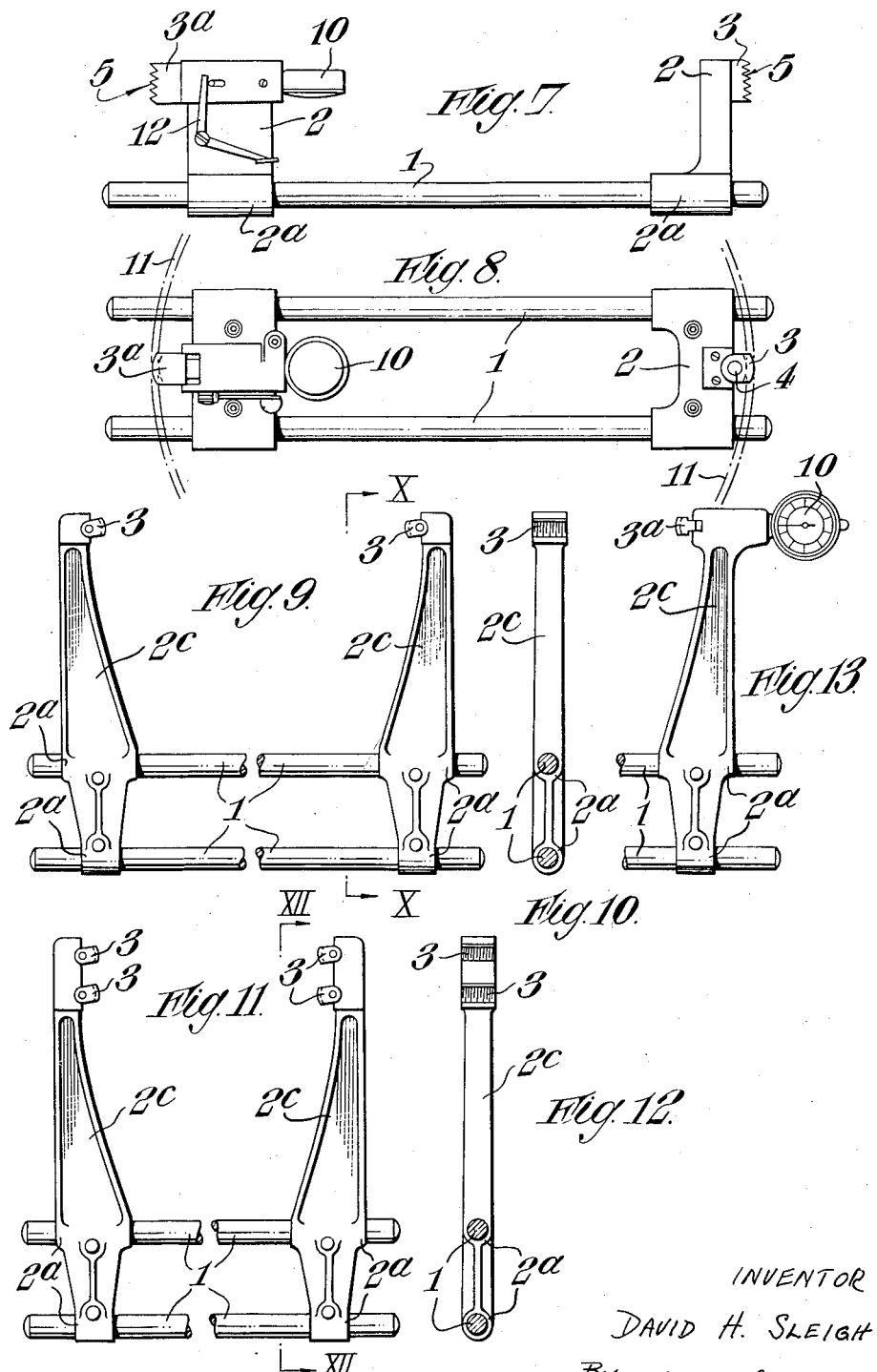

2,911,725

GAUGES FOR THREADED BODIES

David Harold Sleigh, Bath, England

Application January 19, 1956, Serial No. 560,260

Claims priority, application Great Britain
January 21, 1955

3 Claims. (Cl. 33—143)

This invention relates to gauges in which a pair of relatively movable contact members (herein termed "anvils") are mounted opposite one another on respective gauge jaws between which the work is introduced. This type of gauge is referred to herein as a caliper gauge or a gauge of the caliper type. Caliper gauges usually employ a horseshoe shape frame the two arms of which are relatively fixed and constitute the gauge jaws. While caliper gauges are extremely useful when dealing with bodies of small diameter and up to diameters of the order of, say, four inches, they are apt to become too heavy and unwieldy when designed for larger diameters which may lie in the region of twenty inches, and the primary object of the invention is to provide a caliper type gauge which, although capable of dealing with such large diameters, is not increased proportionately in bulk and weight.

According to the said invention, the opposing anvils of a caliper gauge are mounted respectively on a pair of bracket jaws, at least one of the anvils being adjustably mounted for fine adjustment on its jaw, the said jaws being relatively adjustable, for coarse adjustment, on a base beam or frame along which one or both jaws can slide. The gauge would most usually be constructed for gauging threaded bodies by the use of anvils having curved gauging surfaces provided with partial threads for engagement with the threaded body being gauged. While both anvils may be adjustably mounted for fine adjustment on their respective jaws, the invention may be constructed so that one anvil is adjustable on its jaw for fine adjustment and its opposite anvil is slidably mounted on or in its jaw so as to be capable of operating the feeler of a comparator dial gauge. In another form of the invention each jaw is provided with two anvils, each of which co-operates with a complemental anvil on the opposite jaw, to form "Go" and "No Go" gauges.

In order that the said invention may be readily understood some embodiments thereof will be described by way of example with the aid of the accompanying drawings, wherein:

Figures 1, 2 and 3 are respectively elevation, plan, and end view of one form of the invention constructed as a "Go" and "No Go" gauge;

Figures 4 and 5 are respectively elevation and plan of a gauge similar to the one shown in the preceding figures including a comparator dial gauge;

Figure 6 is a section on line VI—VI of Figure 4 drawn to a larger scale;

Figures 7 and 8 are respectively elevation and plan of a form of the invention somewhat similar to that depicted in Figures 4, 5 and 6 but designed as an inside gauge;

Figures 9 and 10 are respectively elevation and section on line X—X (Figure 9) of a further embodiment hereinafter described;

Figures 11 and 12 are respectively elevation and section on line XII—XII (Figure 11) of a still further embodiment hereinafter described, and Figure 13 shows one end of a variation of Figure 9.

Like numerals of reference indicate the same or corresponding parts in the several views.

Referring to Figures 1, 2 and 3, there is employed a beam comprising a pair of parallel rods 1, 1 passing through corresponding sleeves 2a constituting the feet of a pair of bracket jaws 2 whereby the brackets can slide to and fro along the rods so as to be adjusted to a requisite distance one from the other in any suitable manner. One of the bracket jaws 2 may be fixed on the beam and only one constructed movable therealong to produce such relative movement between the bracket jaws or alternatively both bracket jaws may be movable on the beam. The body portions of the brackets extend away from the beam, and thus also away from a plane containing the axes of the sleeves 2a, a suitable distance to allow the work to be introduced therebetween. Remote from the sleeves of each bracket jaw 2 there is a head 2b and each head has mounting means for a convex shape anvil 3 and at least one of these anvils has a bearing hole eccentric to its convex surface 5 engaging over a pivot 4 disposed at right angles to a plane containing the axes of the sleeves 2a. The gauging face 5 of each anvil is grooved to provide partial threads, and the eccentricity to the axis of the pivot 4 enables the inwardly directed faces of opposite anvils to be adjusted to and from one another by moving the anvils about their respective pivots. In the case illustrated in Figures 1, 2 and 3 each bracket jaw contains a pair of anvils 3 arranged side by side (as seen in Figure 2) for "Go" and "No Go" and in this instance the work 6 (Figure 1) is introduced with its axis at right angles to the beam 1, 1 and the anvils pivot in a plane parallel to the beam. The projecting body length of the brackets is determined so that the side-by-side anvils stand clear of the beam sufficiently to enable the whole or part of the threaded length of the component 6 to be gauged. Alternatively (as in Figures 9, 10 and 11) the anvils may be offset to one side of the beam by making the body portion 2c of the arm to extend in a direction parallel to a plane containing the axes of the sleeves 2a, in which case the workpiece would be inserted between the brackets with its axis across the beam instead of being directed towards the beam as in the previous case. The screws 7 in Figure 3 represent means for adjusting and maintaining the anvils in the adjusted position.

The gauge according to the invention may be used in conjunction with a dial gauge or other indicator to enable the thread of the work to be compared in diameter and general form with a master thread or master setting. For example (see Figures 4, 5, 6, 7, 8 and 13), an anvil 3a in one of the bracket jaws may be mounted so as to be slidable in the bracket against the action of a compression spring 8 (Figure 6) so as to operate the feeler 9 of a comparator gauge 10. A comparator gauge may also be employed with the present invention when the latter is adapted for use on a workpiece 11 having female threads as in Figures 7 and 8 by reversing the bracket jaws on the beam members so that a single anvil 3 and 3a at each end faces outwards. In this case operation of the gauge is facilitated if means such as the lever 12 are provided to retract the slidable indicating anvil while both anvils are positioned "in pitch" in the workpiece.

As previously mentioned Figures 9, 10 and 11 illustrate a form of the invention in which the anvils 3 pivot in a direction parallel to a plane containing the axis of the sleeves 2a. The two rods 1, 1 constituting the beam are disposed one above the other in the bracket jaws 2. In Figures 9 and 10 there is shown a single pivoted anvil 3 on each bracket jaw, and Figures 11 and 12 an extra anvil 3 on each jaw to give a "Go" and "No Go" gauge. The construction shown in Figures 9 and 10 may be combined with a comparator gauge 10 as in Figures 4, 5 and 6 in which case one end would carry the comparator as in Figure 13.

The comparator form of beam gauge as a whole is slowly moved across the diameter of the workpiece with the anvils engaged in the thread, and the highest reading on the indicator compared with that taken on a master ring, plug, or other setting device.

I claim:

1. A caliper gauge for a threaded body comprising a pair of parallel rods, a pair of corresponding brackets carried thereby and spaced apart for gauging on diametrically opposite sides of the thread on said body, transversely spaced sleeves with their respective axes in one plane constituting the feet of the brackets through which the rods extend, an anvil mounting head to each bracket and an anvil carried thereby spaced from said sleeve, the anvils being disposed as an opposed pair, arcuately convex faces on said anvils, partial threads across the said convex faces, at least one anvil being eccentrically pivoted, anvil mounting means in said bracket heads for supporting said anvils as a pair in line including on either head a pivot at right angles to the plane containing the bracket sleeves axes for the eccentrically pivoted anvil, said pivot engaging in a bearing hole in said pivoted anvil, said bearing hole being eccentric to the threaded arcuately convex surface, and means for adjusting the brackets relatively to each other on the parallel rods to set the anvils to gauging position.

2. A caliper gauge according to claim 1, wherein said anvil mounting means in the head of each bracket comprises two of said pivots mounted side by side and each carrying an eccentrically pivoted anvil to provide "go" and "no go" gauging positions.

3. A caliper gauge according to claim 1 in which the brackets each comprise an elongated body portion and a foot portion consisting of transversely spaced sleeves having their respective axes in a common plane parallel to the direction in which the body portion extends.

References Cited in the file of this patent

UNITED STATES PATENTS

| | | |
|---|---|---|
| 2,427,924 | Rose | Sept. 23, 1947 |
| 2,432,160 | Johnson | Dec. 9, 1947 |
| 2,436,528 | Polk et al. | Feb. 24, 1948 |
| 2,514,605 | Holmberg | July 11, 1950 |
| 2,578,615 | Twardowski | Dec. 11, 1951 |

FOREIGN PATENTS

| | | |
|---|---|---|
| 511,743 | Great Britain | Aug. 23, 1939 |
| 514,549 | Great Britain | Nov. 10, 1939 |